United States Patent
Feisel

[15] 3,703,113
[45] Nov. 21, 1972

[54] QUICK-CHANGE DEVICE FOR CLAMPING APPARATUS ON TURNING MACHINES

[72] Inventor: Armin Feisel, Schaffhausen, Switzerland

[73] Assignee: Georg Fischer Aktiengesellschaft, Schaffhausen, Switzerland

[22] Filed: June 18, 1971

[21] Appl. No.: 154,478

[30] Foreign Application Priority Data

July 16, 1970 Switzerland............10813/70

[52] U.S. Cl..................82/30, 90/11 A, 279/1 R, 287/111
[51] Int. Cl.............................B23b 19/02
[58] Field of Search......82/30, 28; 90/11 A; 279/1 R, 279/1 B, 106; 287/111, 112, 130

[56] References Cited

UNITED STATES PATENTS 1,961,605   6/1934   Drissner et al................82/30

FOREIGN PATENTS OR APPLICATIONS 833,577   3/1952   Germany..................82/30

Primary Examiner—Gil Weidenfeld
Attorney—Roylance, Abrams, Berdo and Kaul

[57] ABSTRACT

A quick change clamping device for mills, lathes or other turning machines in which a first clamping flange is fixedly attached to, or formed on, the hub of the machine, the first flange being provided with axially extending parallel holes. A second flange of annular configuration is provided with a plurality of axially extending clamping pins which are capable of gripping the second flange, extending into the holes of the first flange, and which are notched to receive a clamping ring. The clamping ring surrounds the first flange and extends inwardly therethrough. Angularly spaced openings permit the clamping pins to be inserted after which the clamping ring is rotated, operating against camming surfaces to pull the second plate firmly against the first, whereupon the clamping ring is tightened by one or more clamping bolts mounted therein. The apparatus is advantageous in that it can be operated rapidly and requires very little time and substantially no alignment for proper operation.

7 Claims, 3 Drawing Figures

3,703,113

QUICK-CHANGE DEVICE FOR CLAMPING APPARATUS ON TURNING MACHINES

The present invention relates to a clamping apparatus for turning machines wherein the device can be quickly changed, i.e., one portion thereof can be removed and another substituted for it, aligned and clamped together very quickly and easily without the need for protracted alignment procedures.

Such quick change devices are necessary for turning machines in which clamping devices adjusted to the work dimensions must be frequently changed.

The prior art includes quick change devices which consist of a clamping flange arranged on the nose of the spindle of the turning machine, the flange being provided with holes or bores located on the circle concentric with the axis of the turning machine, which bores are engaged by radially arranged gudgeons which clampingly engage clamping pins of a clamping device.

Also, quick change devices are known which consist of a clamping flange arranged on the nose of the tool spindle provided with a conical flange receiving arrangement and provided with thread-connected attachment pins, the flange being connected by means of the attachment pins and a clamping plate with a flange carrying the clamping members.

Such arrangements have the disadvantage that the majority of clamping members to be actuated have an adverse effect on the clamping accuracy, and on the changing time of the clamping devices.

This invention is designed to eliminate the foregoing disadvantages, this being achieved by an apparatus in which the first clamping flange is provided with an annular groove around its circumference and extending into axially extending parallel bores, the groove having one surface thereof inclined with respect to the radial plane in which the groove lies. The inclined surface cooperates with a clamping ring which has an inclined surface designed to engage and cam against the surface of the groove. The clamping ring is made in two parts which may be connected together by bolts or, alternatively, may be hinged together at one point. The clamping ring can be tightened circumferentially to permit the inclined surfaces to cam together causing the ring to engage clamping pins in the axial bores, effecting the clamping operation.

In order that the manner in which the foregoing can be understood in detail, a preferred embodiment will be described with reference to the accompanying drawings, which form a part of this specification, and wherein.

Figure 1:
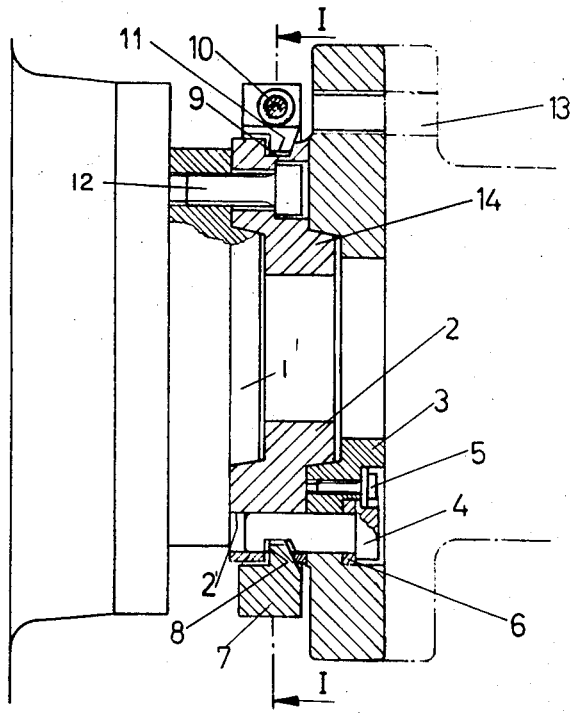
FIG. 1 is a longitudinal section of an apparatus in accordance with the invention, the section being partial and partially rotated along lines II—II of FIG. 2.

As shown in FIG. 1, the spindle of the turning machine is provided with a nose 1 to which the first clamping flange 2 is firmly attached. Flange 2 is provided with several axially extending parallel bores or holes 2' which are located at equal radial distances from the axis of the turning machine or, stated differently, which lie on a concentric circle. A second clamping flange 3 is connected to the clamping device 13, the second flange being provided with a plurality of clamping pins 4 which extend through the second flange and into the axially extending bores 2' of the first flange 2. The second flange 3 is centered on the first flange by means of a short frustroconical surface 14 which is a conventional centering device.

On the periphery of the first clamping flange is provided an annular radially inwardly extending groove 9 having an inner wall, a radial wall and an inclined wall, the last of these being a very short conical surface. A multi-part clamping ring 7 is placed in a position surrounding the first flange, the ring being provided with a radially inwardly extending ridge or rim 11 which is provided with one inclined surface positioned to contact and act against the inclined surface of the first flange; and one radially extending surface positioned to act against the clamping pins. When the clamping ring is in its proper position, the inner protrusion 11 thereof has its inclined surface resting against the inclined surface of annular groove 9 and its radially extending surface, opposite the inclined surface, rests on the supporting surfaces 8 of clamping grooves provided in each clamping pin 4. The clamping pins, which reside in the recessed bores 2' which communicate with the annular groove 9, are provided with enlarged heads capable of gripping the second flange and are exposed at the surface of the second flange. Each pin is provided with a collar which is recessed for engagement with one of a plurality of holding bolts 5 which are threadably connected with the second clamping flange 3.

As previously mentioned, the first clamping flange 2 is centrally located on the spindle nose by a short cone and is held thereon by bolts 12. It will be apparent that the first clamping flange can be formed integrally with the spindle nose rather than being attached thereto by bolts 12.

Clamping ring 7 is held in place, and is tightened, by tangentially extending bolts 10 which are threaded into the clamping ring or which have suitable threaded connecting means. As will be seen in FIG. 2, the portions of clamping ring 7 surrounding bolts 10 at the junction of the segments of the clamping ring are cylindrical recesses 18 coaxial with bolts 10, which recesses contain compression springs 17 which tend to push the clamping ring segments apart. Axially extending circular recesses 21 are provided in the inner edge 11 of clamping ring 7 for the passage of the clamping pins so that the clamping ring can be placed in position before the pins are inserted through bores 2'. As will be seen, portions of pins 4 extend radially outwardly beyond the inner limits of clamping ring 7.

Figure 2:
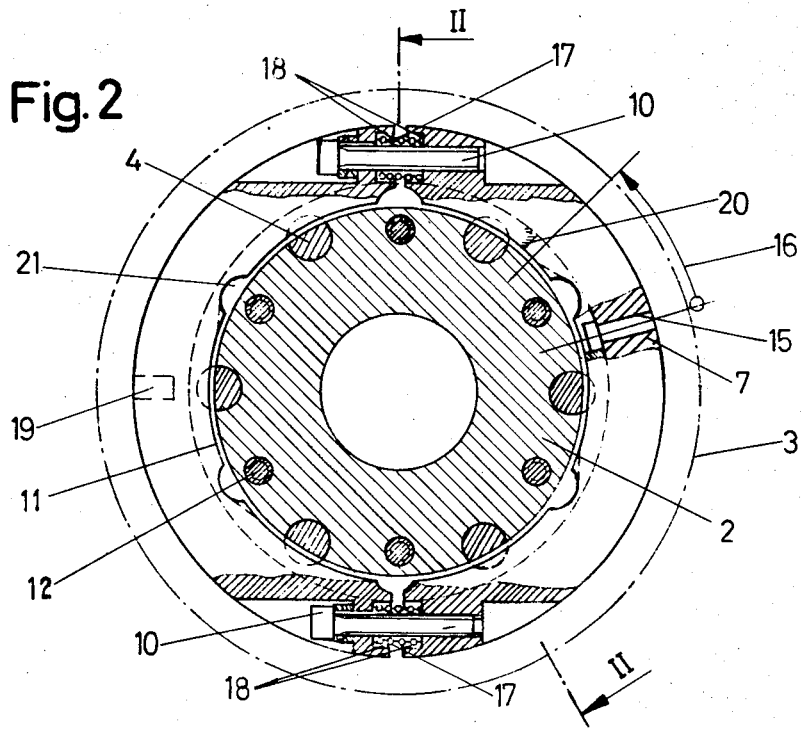
FIG. 2 is a transverse section of the apparatus of FIG. 1 along lines I—I.

Clamping ring 7 is rotatable about the axis of the tool and can be positioned in accordance with an adjustment path between either of two rotary stops. The path 16 is indicated in FIG. 2 as lying between the axes of the extreme positions of a pin or rotary stop 15 which passes through and is carried by clamping ring 7. The inner end of pin 15 is provided with an enlarged head which can abut the end walls of an adjustment groove 20 in first clamping flange 2. In one extreme position of rotary stop 15 and the clamping ring 7, recesses 21 are aligned, or in register with, the bores 2'.

Figure 3:
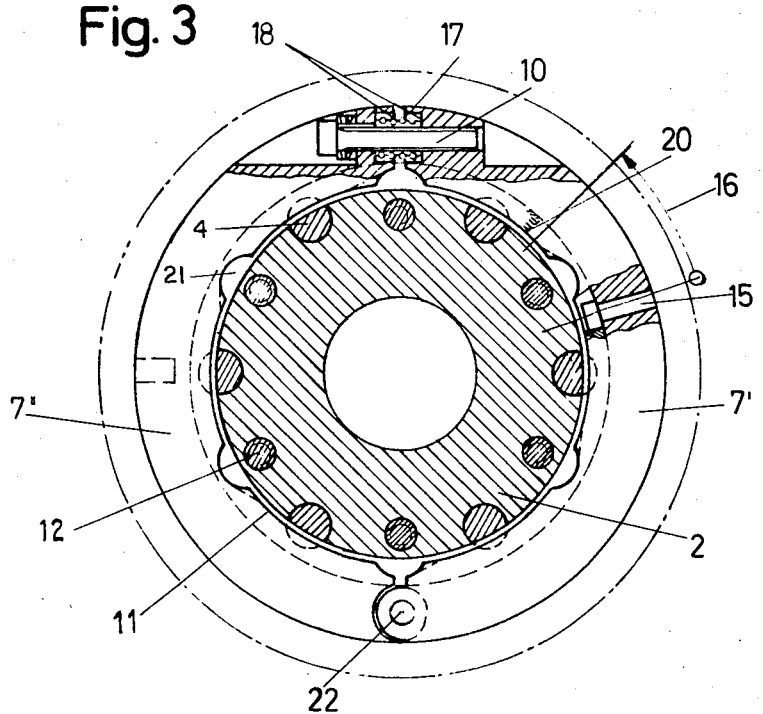
FIG. 3 is a partial cross section of a second embodiment of the invention.

The alternative embodiment of FIG. 3 is substantially the same as the apparatus described with reference to FIGS. 1 and 2 except that one of the clamping bolts 10 is eliminated and is replaced by a hinged joint 22 to connect clamping ring portions 7' and 7'' together.

In the operation of the present invention the spindle of the machine carries the first clamping flange and the clamping ring which is rotated to the position opposite that shown in FIG. 2, i.e., the position in which recesses 21 are aligned with bores 2'. The attachment to be placed on the machine and clamped by the apparatus of this invention is attached to the second clamping ring 3 and is applied to the machine by placing it over the frustroconical surface 14 and inserting clamping pins 4 through the axial bores in the first clamping flange. Clamping ring 7 is then rotated to its other position, preventing removal of the clamping pins. The inner edge 11 of the clamping ring thereupon engages the clamping grooves of clamping pins 4. The clamping screws 10 are then tightened, causing the inner edge 11 to move radially inwardly and causing the inclined surface thereof to cam against the inclined surfaces of flange 2. The clamping ring thereupon tends to move axially to the left, as viewed in FIG. 1, so that the radial surfaces of the inwardly extending portion 11 of the clamping ring engage the supporting surfaces 8 of the clamping grooves in the clamping pins, tending to press the pins further into the bores in the first clamping flange. The second clamping flange is thereby firmly pressed onto the first clamping flange.

It will be observed that a mirror-image reversal of this arrangement can be designed so that the clamping pins 4 protrude from the first clamping flange 2 on the spindle nose 1, and the multi-part clamping ring 7 and the annular groove 9 would then be provided on the second clamping flange 3.

As experiments have revealed, the particular advantages achieved with the invention reside in the fact that substantially shorter change-over times from one tool to another, coupled with improved clamping accuracy of the clamping apparatus, are obtained.

What is claimed is:

1. A clamping apparatus for removably connecting work units to the rotatable spindle of a turning machine comprising the combination of
   a first clamping flange attached to the nose of the turning machine spindle, said first clamping flange having a plurality of axially extending parallel bores therein, said bores being angularly spaced about a circle; a second clamping flange, clamping pins carried by said second flange in positions to enter said bores, each of said pins having a clamping groove; said first clamping flange having a radially inwardly extending annular groove intersecting said bores, said groove having an inclined surface; a clamping ring in said groove; means for decreasing the radius of said ring, said ring having a first surface inclined for contact with the inclined surface of said groove to move the ring axially, and a second surface to engage the grooves of and axially move said pins.

2. A quick-change device according to claim 1 wherein said clamping ring includes at least one pivotable joint and a clamping bolt.

3. A quick-change device according to claim 1 wherein said first clamping flange is removably connected to the spindle nose.

4. A quick-change device according to claim 1 wherein said first clamping flange is integral with the spindle nose.

5. A quick-change device according to claim 1 wherein said clamping ring is divided, wherein said means for decreasing the radius of said ring includes a clamping bolt and wherein a compression spring is arranged concentrically with said clamping bolt at the point where the clamping ring is divided.

6. A quick-change device according to claim 1 wherein said clamping ring is provided with recesses for the passage of the clamping pins on the same radius as the said bores.

7. A quick-change device according to claim 6 wherein said clamping ring further includes a rotary stop and said first clamping flange is provided with an adjustment groove in which said rotary stop is movable, said recesses being in register with the bores when said clamping ring is in one of its stop positions.

* * * * *